Aug. 31, 1965  MARIE-PIERRE PRACHE  3,204,244
LUNEBERG LENS WITH REFLECTING BAND LOCATED AT INTERNAL FOCUS
Filed June 25, 1963  4 Sheets-Sheet 1

θ = 25°
φ = 0°

θ = 25°
φ = 15°

θ = 25°
φ = 25°

United States Patent Office 3,204,244
Patented Aug. 31, 1965

3,204,244
LUNEBERG LENS WITH REFLECTING BAND LOCATED AT INTERNAL FOCUS
Marie-Pierre Prache, Versailles, France, assignor to Lignes Telegraphiques et Telephoniques, Paris, Seine, France, a joint-stock company of France
Filed June 25, 1963, Ser. No. 290,496
Claims priority, application France, June 27, 1962, 902,115
6 Claims. (Cl. 343—911)

The present invention relates to spherical reflectors for high-frequency electro-magnetic waves, and its principal object consists in sending back towards the wave source as large a quantity of energy as possible when the source is in any direction which forms with a pre-determined equatorial plane, known as the reference plane, an angle of inclination less than a given angle, known as the limiting angle.

These reflectors are employed for example on marine beacons; in this case, the direction of the incident rays coming from the source is practically horizontal, and the limiting angle is determined by the maximum inclination which the beacon, and in consequence the reference plane, can take under the action of the sea and wind. These reflectors may also be utilized in aeronautical beacons, which receive waves inclined to the horizontal plane.

The reflectors to which the invention relates comprise a sphere of dielectric material, the permittivity of which varies in accordance with a pre-determined law as a function of the distance to the centre of the sphere.

Reflectors are already known which comprise a sphere of this kind provided with a metallized dome or cap, but they only reflect the rays which come from a cone having an opening or apex angle which cannot exceed 135° if the whole of the energy is to be reflected. It has also been proposed to produce a reflector which sends back the energy towards a source located in any direction which forms with the reference plane an angle less than the limiting angle, by metallizing on the outer surface of the sphere a zone which is limited by two lines parallel to the said reference plane or equatorial plane of the sphere, the two parallel lines limiting the said zone being located on each side of the reference plane. In the description which follows below, a spherical zone of this kind will be termed a belt in order to simplify the description.

A reflector of this kind with a belt on its outer surface has a useful surface area which decreases rapidly with the angular opening of the belt and the angle of inclination, the useful surface being defined as the surface measured in a plane perpendicular to the incident rays, and in which the rays can be sent back to the source after a single reflection, without being stopped by the belt.

It is furthermore known that due to diffraction, the maximum gain, expressed as a ratio of powers, of a spherical reflector having a great-circle surface S, cannot exceed $4\pi S/\lambda^2$, in which $\lambda$ is the wave-length. The maximum equivalent surface is therefore $4\pi S^2/\lambda^2$. It can be assumed without considerable error that the incident wave passes through the reflector without diffraction, and that this diffraction only takes place after passing through the reflector. Under these conditions, the equivalent surface area of a reflector with a belt is $4\pi S_u^2/\lambda^2$, in which $S_u$ is the useful surface area of this latter reflector.

One of the objects of the present invention is to increase the useful surface area irrespective of the angular opening of the belt and regardless of the angle of inclination. For this purpose, the sphere has been provided with an internal belt instead of an external belt.

According to the invention, a reflector for high-frequency electro-magnetic waves comprises a sphere of dielectric material, the permittivity of which is the same at all points located at the same distance from the centre of said sphere and varies as a function of the distance to the centre of the sphere in accordance with a law such that the image of the point at infinity is located practically at a distance from the centre of the sphere which is less than the radius of the sphere, and in which a belt opaque to the electro-magnetic waves is placed at the said distance from the centre. This opaque belt may be formed by metallizing part of the outer surface of the inner sphere which has for its radius the said distance from the centre.

In accordance with one form of embodiment of the invention, the sphere of dielectric material is made-up of a number of superimposed spherical layers, each of which has a dielectric constant different from that of the other layers, and the belt can then be formed by metallization of a portion of the outer surface of an internal layer.

The particular features and advantages of the invention will be better understood by means of the description which follows below of some examples of construction, given by way of explanation and without any limitative sense, reference being made to the accompanying drawings, in which.

Figure 1:
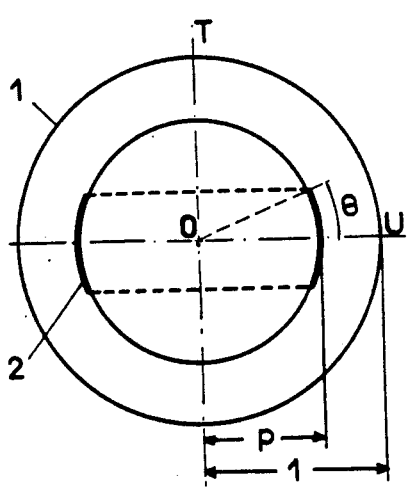
FIG. 1 represents a cross-section of the reflector according to the invention, taken in a plane passing through the diameter perpendicular to the reference plane.

FIG. 1 shows the cross-section of a reflector according to the invention in a plane passing through its axis of symmetry T. The reflector comprises a sphere 1 of dielectric material and a metal belt 2 placed at a distance from the centre of the sphere equal to $p$, this length being standardized by taking the external radius of the sphere 1 as the unit of length. The planes perpendicular to the axis of symmetry T and passing through the edges of the belt are designated respectively as the upper plane and the lower plane of the belt.

The figures and calculations are given for the case where the belt is symmetrical with respect to an equatorial plane, the edge of which is indicated by the line U in FIG. 1. The half opening-angle of the belt is designated by $\theta$; this angle is shown in FIG. 1 by the acute angle made with the plane U by a straight line passing through the centre of the sphere and the edge of the belt.

As has been previously stated, the law of variation of the permittivity with the distance from the centre of the sphere must be such that the image of the point at infinity is located practically at a distance $p$ from the centre. Amongst the various possible laws which enable this condition to be obtained, there has been chosen for the following description the law indicated by A. S. Gutman in the article entitled, "Modified Luneberg Lens," in the review, "Journal of Applied Physics," for July 1954, pages 855 to 859, and which is expressed by:

$$\epsilon = \frac{1+p^2-r^2}{p^2} \quad (1)$$

in which $r$ is the distance from the centre to the point of permittivity $\epsilon$.

Figure 2:
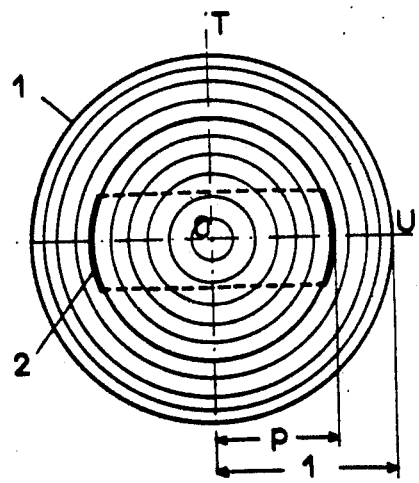
FIG. 2 shows a reflector with superimposed layers.

In a preferred form of embodiment of the invention, the variation of permittivity is not continuous, but the reflector is formed by the superimposition of homogeneous spherical layers, as shown in FIG. 2, the permittivity of each layer at the half-thickness being in the neighbourhood of that given by Formula 1 and the number of layers is sufficient for the calculations which follow to be applicable in practice to this preferred form of embodiment.

Figure 3:
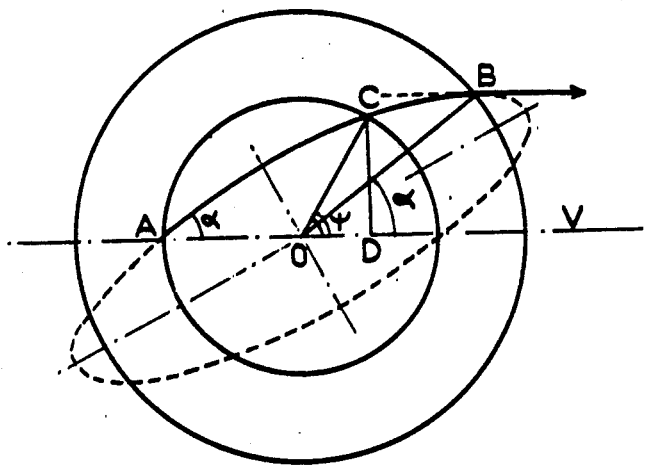
FIG. 3 show the trajectory of a ray.

As the reflector is symmetrically spherical, the paths of the rays are planar curves; they are arcs of an ellipse having as their centre the centre O of the sphere. One of these paths is illustrated in FIG. 3. The planar wave meets the outer surface of the sphere at B. In this sphere, it passes over the arc BCA, where C is the point at which it meets the spherical surface which carries the belt and A is the image point of the point at infinity. The equation of this curve referred to Cartesian coordinates with an origin 0 is:

$$x^2 - 2xy \cotg \alpha + y^2[\cotg^2 \alpha + p^2(1 + \cotg^2 \alpha)] - p^2 = 0 \quad (2)$$

in which the parameter $\alpha$ in the angle made by the tangent to the trajectory at the point A with the straight line OA. As the straight line OB which joins the centre O to the point B at which the trajectory passes out of the reflector is conjugated with OA, the angle at O of the straight line OB with the outline of the plane V is equal to $\alpha$.

A relation which subsequently be useful is that which associates the angle $\alpha$ with the angle $\psi$ made by the plane V with the straight line OC joining the centre O to the point C. In order to find this relation, $x$ and $y$ are replaced in Equation 2 by their following values:

$$x = p \cos \psi \text{ and } y = p \sin \psi \quad (3)$$

from which there is obtained:

$$\cotg \alpha = \frac{\cotg \psi \pm \sqrt{\cotg^2 \psi + 1 - p^4}}{1 + p^2} \quad (4)$$

and in consequence:

$$\sin \alpha = \frac{1 + p^2}{\sqrt{2[1 + p^2 + \cotg^2 \psi + \cotg \psi \sqrt{\cotg^2 \psi + 1 - p^4}]}} \quad (5)$$

In order to show the advantages of the device according to the present invention, the useful surface of the reflector according to the invention will be determined and compared with that of reflectors with an external belt.

Figure 4:
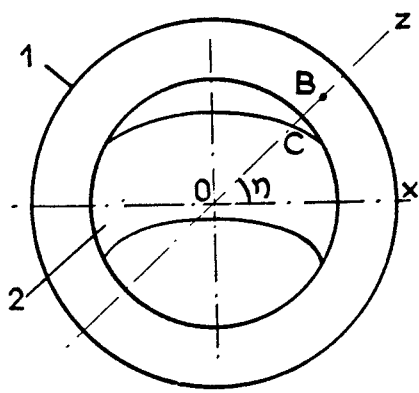
FIGS. 4 and 5 show respectively a front view and a profile view in cross-section of the reflector.
Figure 5:
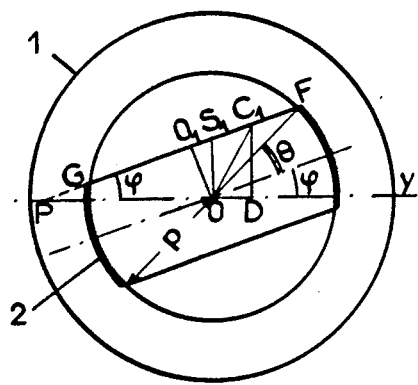

In FIG. 4 there is shown a cross-section of the reflector made in a plane passing through the centre of the sphere and perpendicular to the direction of the incident rays, and on which there has been drawn the projection of the edges of the front portion of the belt and at B the projection of the point at which an incident ray meets the outer sphere. FIG. 5 shows a profile view in cross-section in a plane passing through the centre of the sphere and perpendicular to the preceding plane. The belt is indicated at 2, as in FIG. 1.

As has been previously stated, the belt may be inclined with respect to the reference plane. An inclination about the axis Y parallel to the incident rays obviously has no influence on the useful surface, and will not be considered in the present description. There will thus be considered only the case where the belt is inclined about the axis X at right angles to the incident rays and located in the reference plane. The angle of inclination of the belt 2 with respect to the reference plane having its edge at line Y on FIG. 5 is designated by $\varphi$.

It is proposed to determine the form and the magnitude of the useful surface of the reflector, that is to say the surface measured in the plane of FIG. 4 and in which the rays can be sent back to the source after a single reflection, without being stopped by the belt. The said useful surface is composed of two portions symmetrical with respect to the axis X, and the present study can thus be limited to the upper portion.

The useful surface is limited by the rays which touch the edge of the belt. The limiting curve of the surface is thus the projection on the plane of FIG. 4 of the line which forms the locus of intersection of the rays passing over the edge of the belt with the outer surface of the reflector.

This line will be determined by cutting the plane of FIG. 4 by a plane having its edge represented by line Z on the plane of the drawing, and which makes an angle $\eta$ with the axis X. The plane Z cuts the upper plane of the belt and the sphere of radius $p$ at a point C. The upper plane of the belt is shown in FIG. 5 by its edge FG; it meets the axis Y at a point P such that:

$$PO = p \frac{\sin \theta}{\sin \varphi} \quad (6)$$

and $$PO_1 = p \sin \theta \cotg \varphi \quad (7)$$

The perpendicular at O to the axis Y cuts the straight line PF at a point $S_1$, such that:

$$PS_1 = p \frac{\sin \theta}{\sin \varphi \cos \varphi} \quad (8)$$

Figure 6:
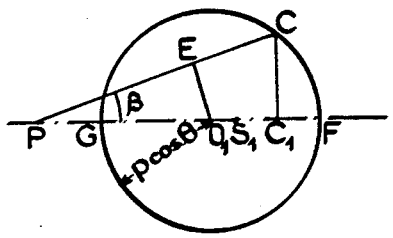
FIG. 6 shows the upper plane of the belt.

The upper plane of the belt is shown in FIG. 6. It cuts the belt along a circumference having a centre $O_1$ and a radius $p \cos \theta$. The edge of the plane Z on the plane of FIG. 6 is a straight line PC forming with $PO_1$ an angle $\beta$ such that:

$$tg\beta = \sin \varphi \cotg \eta \quad (9)$$

The perpendicular at C to the axis $PO_1$ meets this straight line at $C_1$. The point $S_1$ defined on FIG. 5 is referred at $S_1$ on FIG. 6. E is the foot of the perpendicular dropped from $O_1$ on PC.

It is possible to calculate the length of $S_1C_1$, which is useful subsequently. It is equal to:

$$S_1C_1 = PC_1 - PS_1 = (PE + EC) \cos \beta - PS_1 \quad (10)$$

Replacing $PS_1$ by its value given in Equation 8, PE and EC by their values deduced from the relations in the triangles of FIG. 6, and taking acount of (7), there is obtained:

$$S_1C_1 = a + b - c \quad (11)$$

in which:

$a = p \sin \theta \cotg \varphi \cos^2 \beta$ $b = p \cos \beta \sqrt{\cos^2 \theta - \sin^2\theta \cotg^2 \varphi \sin^2\beta}$ $$c = p \frac{\sin \theta}{\sin \varphi \cos \varphi}$$

Now the length $S_1C_1$ of FIG. 6 given by the Equation 11 above is equal to the length $S_1C_1$ of FIG. 5; from this there is obtained:

$$OD = S_1C_1 \cos \varphi \quad (12)$$

However, it is now possible to consider FIG. 3 as representing the section of the reflector by the plane perpendicular to the plane of FIG. 4, represented by Z. FIG. 3 thus shows the trajectory of a ray in the plane Z. From this figure it can be seen that:

$$\cos \psi = \frac{OD}{p} \quad (13)$$

Replacing OD by its expression in Equation 12 and substituting in this equation the value of $S_1C_1$ obtained from (11), there is obtained after several conversions:

$$\cos \psi = \frac{1}{1 - \cos^2 \eta \cos^2 \varphi} \left[ \cos \varphi \sin \eta \sqrt{\cos^2 \theta - \cos^2 \varphi \cos^2 \eta} - \sin \theta \sin \varphi \right] \quad (14)$$

When the values of $\theta$ and $\varphi$ are given, Equation 14 enables the angle $\psi$ to be calculated for different values of the angle $\eta$ chosen as a parameter. If the value of $p$ is then fixed, the Equation 3, which expresses $\sin \alpha$ as a function of $\psi$ and of $p$ enables $\sin \alpha$ to be calculated.

By transferring on FIG. 4 a vector $OB = \sin \alpha$ for each value of $\eta$, there is obtained the outline by points of the curve which limits the useful surface.

The Equation 14 is simplified in the case where the reflector is not inclined and in the case where it is at its maximum inclination.

In the first case, $\varphi = 0$, and the Equation 14 becomes:

$$\cos \psi = \frac{\sqrt{\cos^2 \theta - \cos^2 \eta}}{\sin \eta} \quad (15)$$

In the second case, $\varphi = \theta$, and Equation 14 becomes:

$$\cos \psi = \frac{\cos^2 \theta \sin^2 \eta - \sin^2 \theta}{1 - \cos^2 \eta \cos^2 \theta} \quad (16)$$

Figure 7:
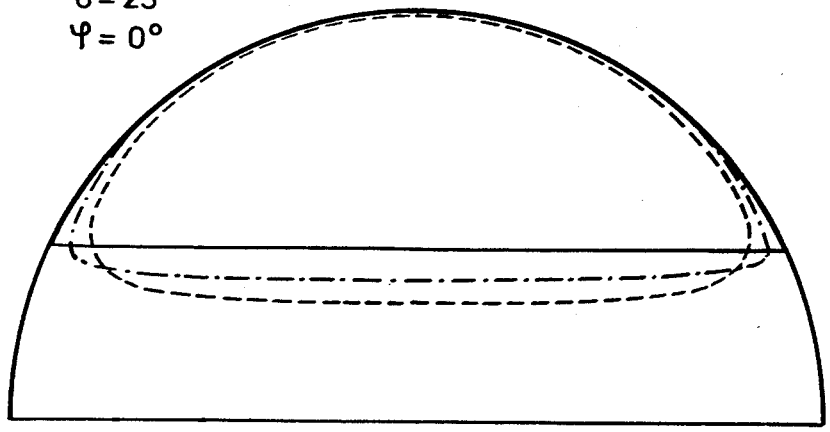
FIGS. 7, 8 and 9 show the useful surface of the reflector for different cases.
Figure 8:
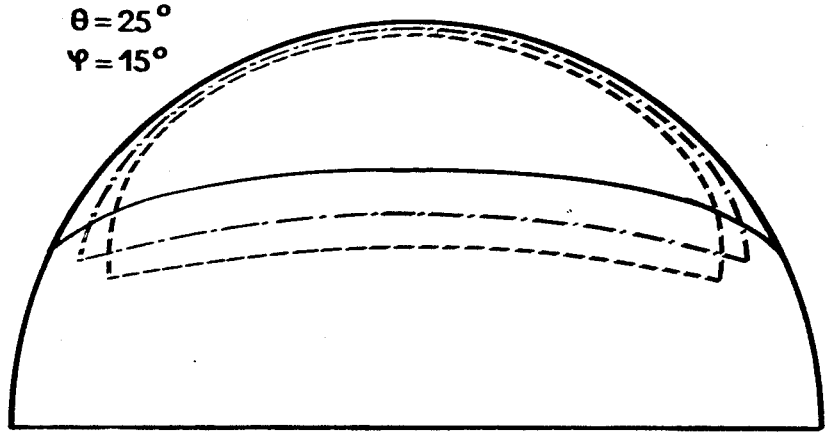
Figure 9:
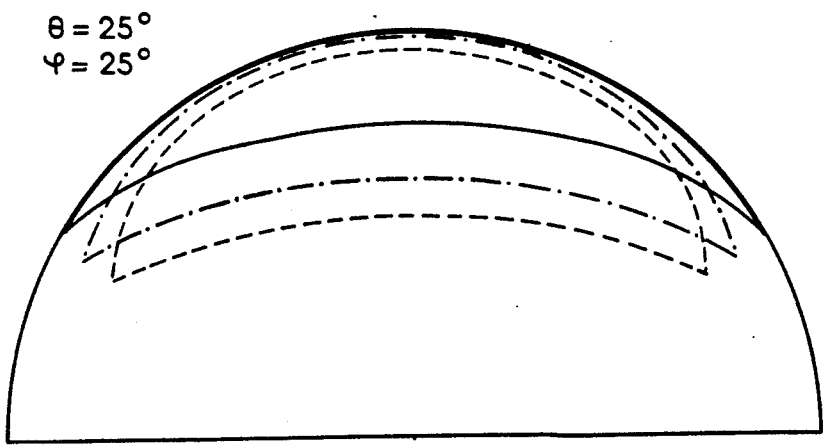

By the method which has just been explained, the limits of the useful surface have been determined for half-openings $\theta$ of the belt and for inclination angles $\varphi$. By way of example, there have been shown in FIGS. 7, 8 and 9 the limits thus determined for $\theta = 25°$, FIGS. 7, 8 and 9 corresponding respectively to $\varphi = 0°$, $\varphi = 15°$ and $\varphi = 25°$. The curve in broken lines corresponds to $p = 0.6$, the curve in chain-dotted lines to $p = 0.8$ and the curve in full lines to $p = 1$, that is to say to the case where the belt is located on the outer surface of the sphere. These figures clearly show that the useful surface of a reflector with an internal belt is greater than that of the reflector with external belt, and that the ratio of the useful surfaces increases as the inclination increases.

The loss of equivalent surface with respect to that of the reflector with a metallized dome is obtained by taking the logarithm of the square of the ratio of the useful surface, determined in the manner explained above, to the surface of the great circle of the sphere.

Figure 10:
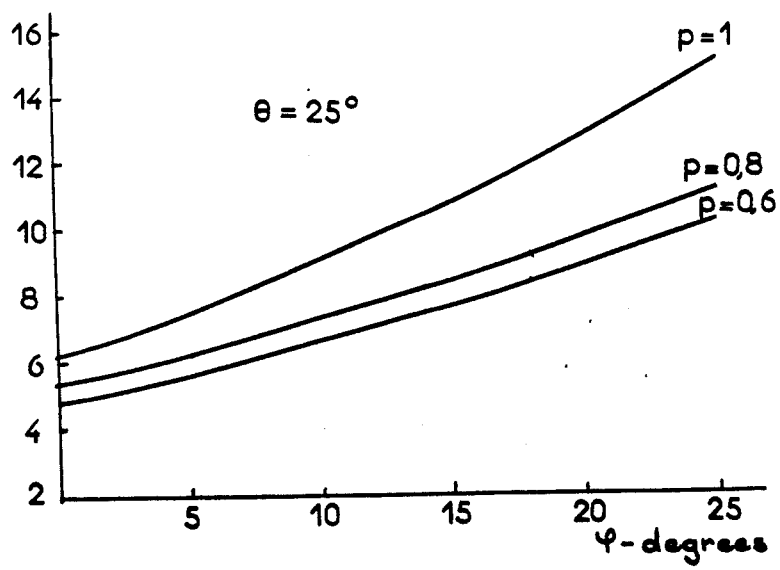
FIG. 10 shows the equivalent surface loss with respect to a reflector with a metallized dome.

The values of this loss in $dB$ in the case where $\theta = 25°$ are shown in FIG. 10 as a function of the angle $\alpha$ in degrees, for the different values of $p$ already considered ($p = 0.6$; $p = 0.8$; $p = 1$). It can be seen from the curves that the loss of equivalent surface is much smaller for reflectors with inner belts than for the reflector with external belt, and that this advantage becomes increasingly great as the inclination increases.

The advantages indicated above become still more marked as $p$ becomes smaller. On the other hand however, when $p$ is smaller, the reflector is heavier since Equation 1 results in higher permittivities.

I claim:

1. A spherical reflector for high-frequency electro-magnetic waves comprising a sphere of low-loss dielectric material, the permittivity or dielectric constant of which is the same at all points located at the same distance from the centre of said sphere and varies in accordance with a law such that the image of a point at infinity is formed practically in a point located on a spherical surface concentric with and within said sphere, the radius of said surface being less than that of said sphere; and a reflecting belt opaque to said waves, and having the form of a spherical zone concentric with said sphere and constituting a portion of said spherical surface, said spherical zone being limited by two lines parallel to an equatorial plane of the sphere and located on each side of this plane whereby for effective reflector action the distance between said two parallel lines limiting said spherical zone is less than the corresponding distance would be with said spherical surface coinciding with said sphere.

2. A reflector for high-frequency electro-magnetic waves, as claimed in claim 1, in which the permittivity $\epsilon$ at a point of the sphere of dielectric material varies in accordance with the law:

$$\epsilon = \frac{1 + p^2 - r^2}{p^2}$$

in which $r$ is the distance from the point considered to the centre of said sphere and $p$ is the distance from the belt to said centre, the radius of the sphere being taken as the unit of length.

3. A reflector for high-frequency electro-magnetic waves as claimed in claim 1, in which the distance from the belt to the centre of the sphere of dielectric material and the radius of said sphere are in a ratio comprised between 0.50 and 0.90.

4. A spherical reflector for high-frequency electro-magnetic waves comprising a sphere constituted by homogeneous concentric layers of low-loss dielectric material applied one against the other, the permittivity or dielectric constant of said dielectric material being uniform in each layer and varying from one layer to the other in accordance with a certain law as a function of their distance from the centre of said sphere; a reflecting belt opaque to said waves and having the form of a spherical zone applied internally of said sphere against one of the faces of one of said homogeneous layers, said spherical zone being limited by two lines parallel to an equatorial plane of the sphere and located on each side of this plane; said law of variation of the permittivity being such that the image of a point at infinity is practically located in a point situated on said belt whereby for effective reflector action the distance between said two parallel lines limiting said spherical zone is less than the corresponding distance would be with said face of said homogeneous layer having said spherical zone thereon located a distance from the centre of said sphere equal to the radius of said sphere.

5. A reflector for high-frequency electro-magnetic waves as claimed in claim 4, in which the permittivity $\epsilon$ in each of the homogeneous layers of the sphere of dielectric material is given by the equation:

$$\epsilon = \frac{1 + p^2 - r^2}{p^2}$$

in which $r$ is the distance from the points at the mid-thickness of the layer concerned to the centre of the sphere, and $p$ is the distance from the belt to said centre, the radius of the sphere being taken as the unit of length.

6. A reflector for high-frequency electro-magnetic waves as claimed in claim 4, in which the distance from the belt to the centre of said sphere, constituted by concentric homogeneous layers of low-loss dielectric material and the radius of said sphere are in a ratio comprised between 0.50 and 0.90.

References Cited by the Examiner

Gutman, Modified Luneberg Lens, Journal of Applied Physics, vol. 25, No. 7, July 1954, pp. 855–859 relied on.

Morgan, General Solution of the Luneberg Lens Problem, Journal of Applied Physics, vol. 29, No. 9, Sept. 1958, pp. 1358–1368 relied on.

Schrank: "Spherical Radar Reflectors With High-Gain Omnidirectional Response," Technical Papers Presented at the Sixth Annual East Coast Conference on Aeronautical and Navigational Electronics; Oct. 26–28, 1959.

HERMAN KARL SAALBACH, *Primary Examiner*.